United States Patent [19]
Mecca

[11] 3,726,071
[45] Apr. 10, 1973

[54] FOLIAGE AGITATING MEANS FOR HARVESTING MACHINES

[75] Inventor: Vito M. Mecca, North Collins, N.Y.

[73] Assignee: Mecca Bros., Inc., North Collins, N.Y.

[22] Filed: July 23, 1971

[21] Appl. No.: 165,083

[52] U.S. Cl. ............................................... 56/330
[51] Int. Cl. .............................................. A01g 19/00
[58] Field of Search ..................... 56/330, 328, 46, 56/28, 29, 126

[56] References Cited

UNITED STATES PATENTS

| | | | |
|---|---|---|---|
| 2,140,399 | 12/1938 | Connolly | 56/28 |
| 3,538,694 | 11/1970 | Holloway | 56/330 |
| 3,439,482 | 4/1969 | Orton | 56/330 |
| 3,478,501 | 11/1969 | Patzlaff | 56/330 |
| 3,473,311 | 10/1969 | Fox | 56/330 |
| 3,325,984 | 6/1967 | Christie et al. | 56/330 |
| 1,888,505 | 11/1932 | Johnston | 56/46 |
| 3,581,485 | 6/1971 | McKibben | 56/330 |

Primary Examiner—Russell R. Kinsey
Attorney—Conrad Christel et al.

[57] ABSTRACT

An ambulatory supporting frame provided with wheels is adapted for longitudinal movement along a row of plants by a separate vehicle. A shaker means carried by the frame includes a plurality of beater elements, in the form of plates or slats, which extend toward opposite sides of the row of plants and bear against the foliage of the plants. The beater elements on one side of the row are staggered relative to the beater elements on the opposite side of the row, and the beater elements are arranged in a plurality of vertical series of elements on each side of the row. A motive means carried by the frame moves the beater elements toward and away from the row to shake the crops off the plants. The removed crops are collected by a movable floor and conveyor system provided on the frame.

9 Claims, 4 Drawing Figures

INVENTOR.
VITO M. MECCA

FOLIAGE AGITATING MEANS FOR HARVESTING MACHINES

BACKGROUND OF THE INVENTION

This invention relates to harvesting machinery and, more particularly, to a machine for harvesting crops from bushes or vines planted in rows.

Mechanical harvesting of crops, for example grapes, is highly desirable in being faster and cheaper than manual labor. Machinery has been proposed which employs vibratory or agitating means for detaching crops, for example grapes, from vines or bushes. The peculiar problems associated with harvesting, however, impose many significant performance requirements on such machinery. For example, there should be maximum removal of the crops with minimum injury or damage thereto. In addition, there should be little or no damage to the vine or bush so that it can continue to grow additional crops. It is also desired to minimize removal of leaves and other unwanted matter from the vines or bush with the crops.

It would, therefore, be highly desirable to provide a harvesting machine for row crops which satisfies these and other performance requirements while being relatively simple in construction and convenient and efficient in maintenance and operation.

SUMMARY OF THE INVENTION

The present invention provies a harvesting machine for row crops including a shaker means carried by a frame movable along a row of plants which shaker means includes a plurality of beater elements which are arranged and agitated in a manner effecting a highly efficient removal of crops from the plants. In particular, the beater elements extend from the frame toward opposite sides of the row to bear against the foliage of the plants, the beater elements on one side of the row are staggered relative to the beater elements on the opposite side of the row, and the beater elements are moved by means carried by the machine frame toward and away from the row to shake the crops off the plants.

By way of illustration the present invention will be described with particular reference to harvesting machinery of the type wherein crops growing on bushes or vines planted in rows are agitated, although the principles of the invention may be variously applied. While a single specific embodiment of the principles of the present invention is illustrated in the accompanying drawing and described in detail in the following specification, it is to be understood that such embodiment is by way of example only and that various mechanical modifications may be made without departing from the spirit and scope of the invention.

BRIEF DESCRIPTION OF THE DRAWING FIGURES

DETAILED DESCRIPTION OF THE ILLUSTRATED EMBODIMENT

Figure 2:
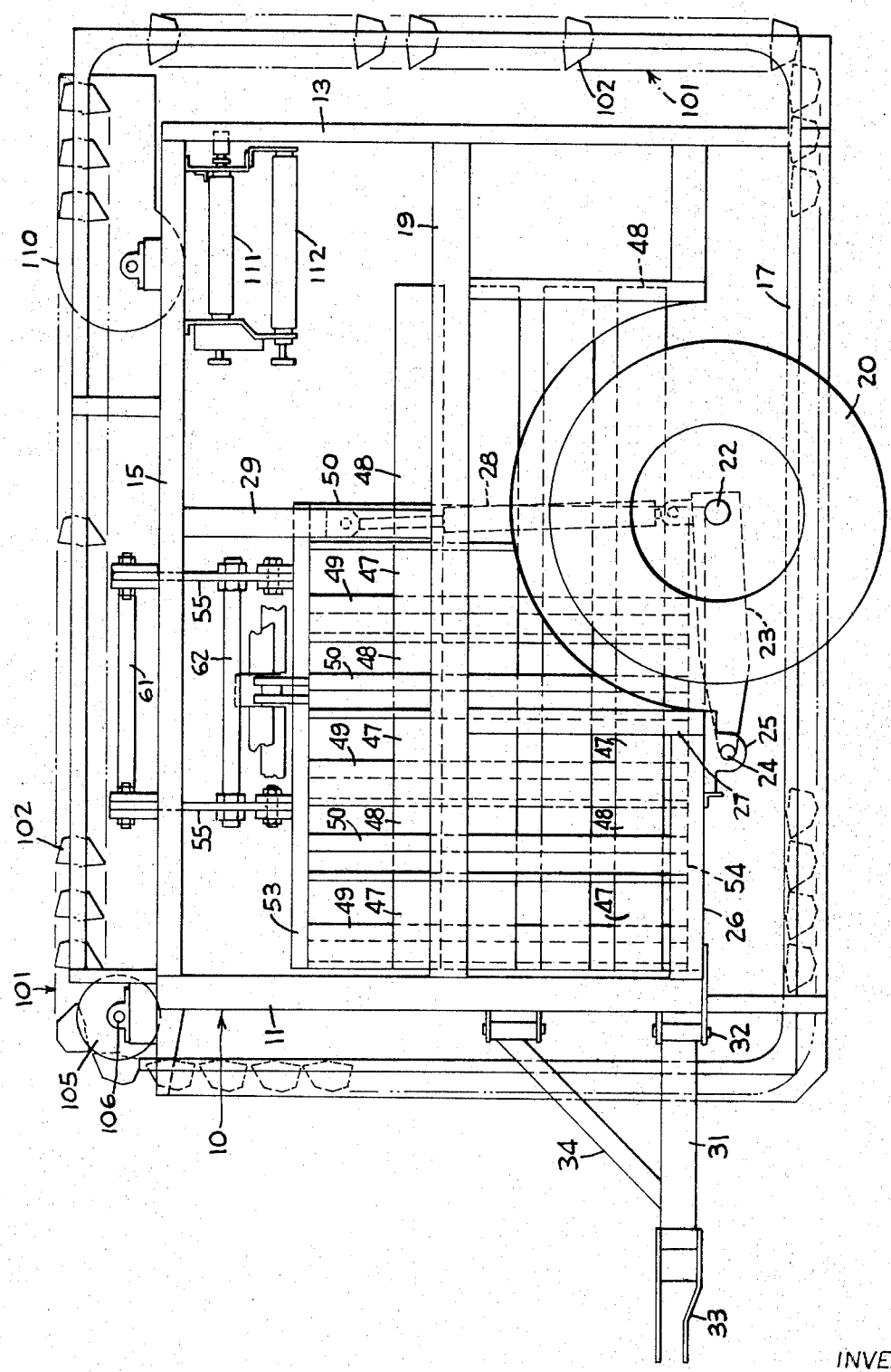
FIG. 2 is a fragmentary side elevational view of the harvesting machine of FIG. 1.

A harvesting machine of the present invention includes an ambulatory supporting frame 10 which is adapted for longitudinal movement along a row of plants. The frame includes, briefly, vertical end members 11–14 and upper and lower generally horizontal side members 15, 16 and 17, 18 respectively, as shown more clearly in FIG. 2. An intermediate side frame member is also included, one being shown at 19 in FIG. 2. The frame members thus are arranged so as to enable the machine to straddle a row of plants or vines as it is moved longitudinally along the row. A pair of wheels 20, 21 each are connected to the frame 10 in a rotatable, shock-absorbing manner. As shown in FIG. 2, wheel 20 is rotatably connected through an axle 22 to a link or connecting member 23, which is pivotally connected at 24 to a bracket 25. The bracket, in turn, is fixedly attached to auxiliary frame members 26, 27 which are rigidly attached to the frame members 11, 19 respectively. The link 23 is also connected to one end of a hydraulic cylinder 28, the piston rod of which is pivotally connected to a depending frame member 29 fixedly attached to frame member 15. Wheel 21 is connected rotatably and in a shock-absorbing manner to frame 10 by a similar arrangement included on the other side thereof.

The machine provided by the present invention is of the type adapted to be moved along a row of plants by a separate vehicle, for example a tractor. A suitable arrangement thus is provided for connecting the frame 10 the vehicle which will draw it. As shown in FIG. 2, a generally horizontal bar 31 is connected through a suitable bracket 32 to one of the frame members and near the lower portion of frame 10. A conventional hitch 33 is included on bar 31 for connection to the vehicle, and preferably a supporting arm 34 is connected at one end to bar 31 and at the other end through a bracket 35 to frame 10.

Figure 1:
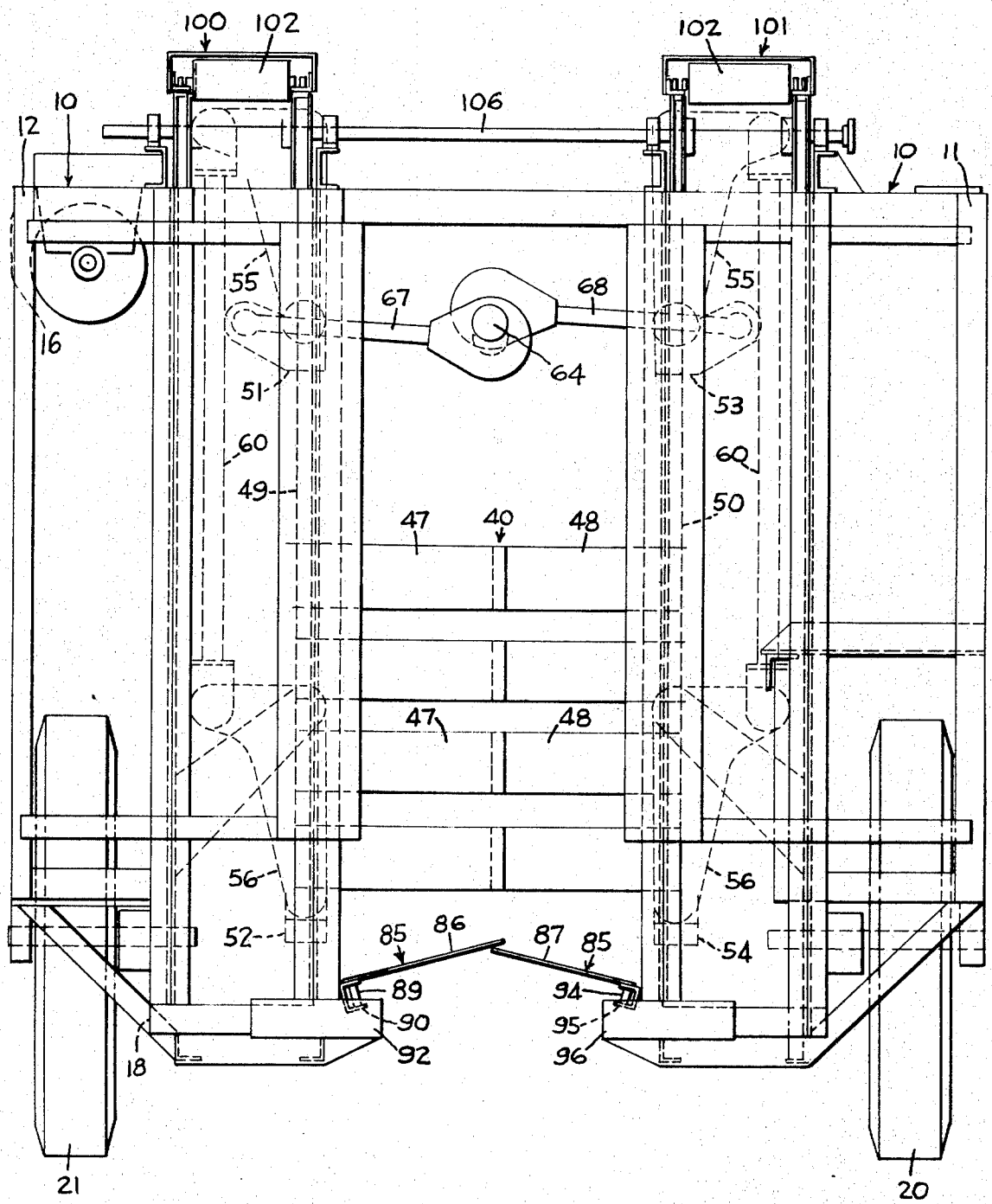
FIG. 1 is a fragmentary elevational view of one end of a harvesting machine according to the present invention.
Figure 3:
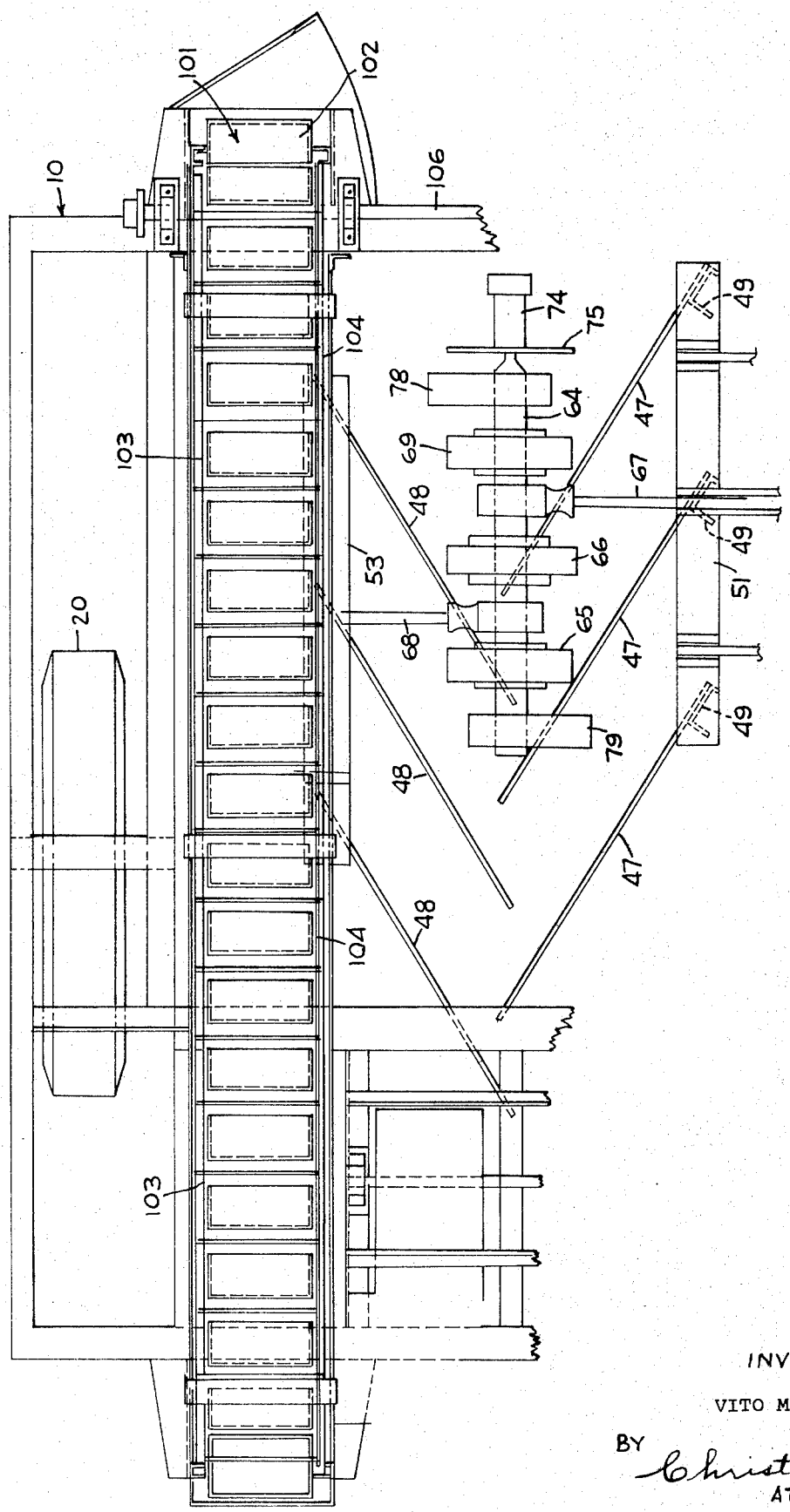
FIG. 3 is a fragmentary plan view of the harvesting machine of FIG. 1.
Figure 4:
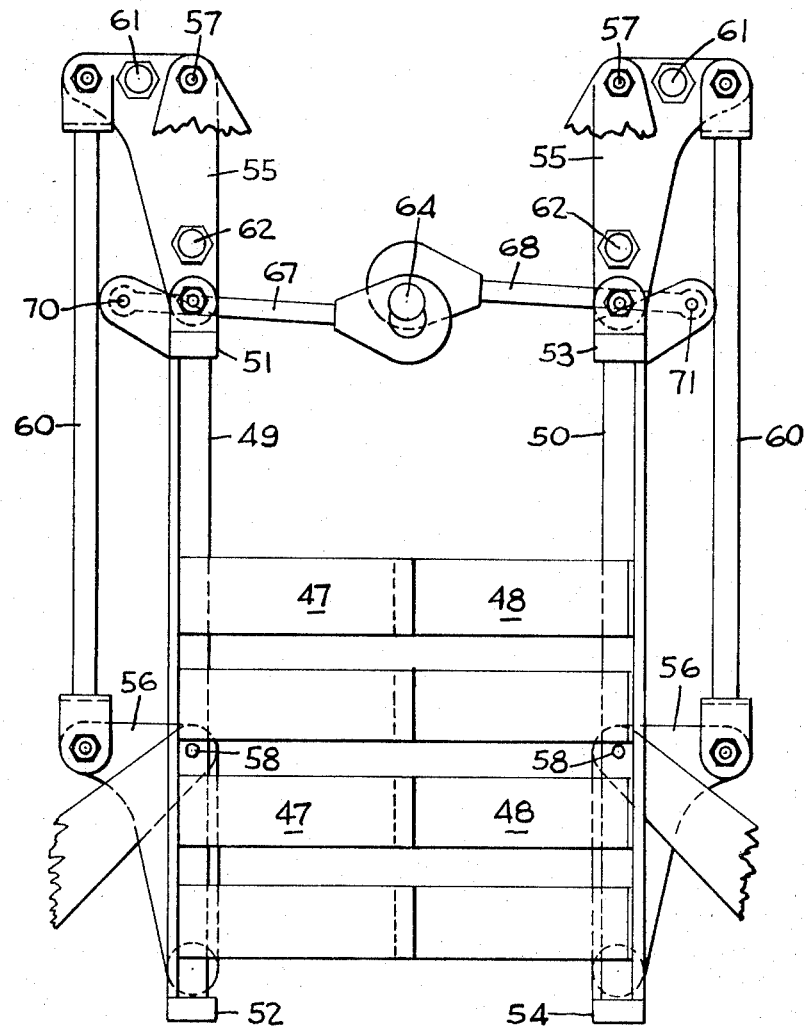
FIG. 4 is a fragmentary elevational view of shaker means according to the present invention and included in the harvesting machine of FIG. 1.

The harvesting machine of the present invention further comprises shaker means, designated generally 40, carried by the machine frame 10 and including a plurality of foliage agitating members or beater elements which extend from opposite sides of the machine toward opposite sides of a row of plants when the machine is moved along the row. Referring now to FIGS. 1 and 4, the foliage agitating members or beater elements comprise plates or slats 47 and 48 extending inwardly from opposite sides of the machine to bear against the foliage. The slats 47 at the left-hand side of the machine as viewed in FIGS. 1, 3 and 4 comprise three vertical series, with each vertical series fixed to an angle member 49 which is fixed at its upper and lower ends to longitudinally extending beams 51 and 52, respectively. Similarly, the beater elements 48 at the opposite side of the machine are likewise fixed to vertical angle members 50 which are fixed at their upper and lower ends to beams 53 and 54, respectively.

It will be particularly noted that the beater elements 47 at one side of the machine are staggered with respect to the beater elements 48 at the opposite side of the machine so that, in effect, the foliage is pushed first in one direction and then the other as the machine moves along a row. In addition, the beater elements 47 and 48 at opposite sides of the machine are mounted and driven to move alternately away from each other and toward each other during machine travel for further agitating the foliage. Preferably, each beater element 47, 48 is elongated and disposed so that the longitudinal axis thereof extends rearwardly relative to the forward direction of travel of the machine, as shown in FIG. 3.

The means for mounting and moving the beaters at one side of the machine will now be described, the mounting and moving means for the beaters at the other side of the machine being the same but of opposite hand. A pair of bell cranks 55 and 56 are pivoted as at 57 and 58, respectively, to clevis brackets forming a fixed part of the machine framework and the lower ends of the bell cranks 55 and 56 are pivoted to clevis brackets mounted on the beams 51 and 52. The bell cranks 55 and 56 are pivotally connected by a vertical rod 60 which, together with the beater frame 49, 51, 52 forms a parallelogram linkage whereby the beater frame maintains a substantially vertical position during movements toward and away from the center line of the machine.

There are two longitudinally spaced sets of bell cranks 55 and 56 at the left-hand side of the machine and the upper bell cranks 55 are connected by longitudinal tie rods 61 and 62 which synchonize the longitudinally spaced bell cranks and thus further assure maintenance of the beater frame in a vertical plane during its reciprocating movement.

A crank shaft 64 is journaled in the machine framework as at 65, 66, 69 and has a pair of opposed throws which reciprocate connecting rods 67 and 68 simultaneously in opposite directions. The outer ends of the connecting rods 67 and 68 are pivoted to clevis brackets fixed to beams 51 and 53 as at 70 and 71, respectively. Crank shaft 64 is rotated by means of a hydraulic motor 74 which is carried by the crank shaft but whose housing is held against rotation by a torque arm 75 which extends to a fixed portion of the machine framework. The crank shaft 64 also carries eccentric fly wheels 78 and 79 which are provided for the purpose of neutralizing the dynamic imbalance of the crank shaft and the parts reciprocated thereby. As a result, the beater frames and corresponding beater elements 47, 48 fixed thereto are moved simultaneously toward and away from the center line of the harvesting machine.

The harvesting machine further includes components whereby the crops, for example grapes, upon being removed from the plants or vines by action of shaker means 40 first are directed to and collected generally in the lower region of the frame 10, then are conveyed to a zone or point preferably in the upper region or frame 10, and finally are collected by a suitable arrangement and transmitted or conveyed to storage receptacles. Such receptacles, of course, can be carried externally on the frame 10 or carried by a separate vehicle moving alongside of the frame 10. Referring now to FIG. 1, a floor 85 comprises a plurality of opposed shutters, two of which are indicated at 86 and 87, which are disposed in a generally "herring-bone" fashion along the direction of travel of the machine. Since such flooring arrangements are well-known in the art, a brief description is deemed sufficient. Each shutter, for example shutter 86, is piovtally mounted on a pin 89 which is connected in a channel member 90 which, in turn, is mounted on an inwardly directed portion 92 of a lower member of machine frame 10. Shutter 87 shown in FIG. 1 is connected by a similar arrangement including pin 94, channel member 95, and frame portion 96. Each shutter is held in a normally closed position by a coil spring (not shown) connected thereto and to the channel member. As a result, the shutters progressively and yieldingly open and close about the plant stems or vines as the machine travels along a row of plants. As shown in FIG. 1, the shutters 86, 87 extend outwardly and downwardly from the center of the machine to ensure that crops which fall onto flooring 85 are directed toward the conveyor system which now will be described.

The conveyor system includes two spaced-apart paths 100, 101 defined by an arrangement of rails or tracks each of which paths, in turn, includes spaced-apart generally horizontal and vertical portions so as to be substantially rectangular. Each path includes a plurality of buckets, one being designated 102, for carrying harvested crops such as grapes, and the buckets of each path are moved by an endless chain, such as chains 103, 104, connected to the buckets and to a drive means. The latter comprises a conveyor drive motor and flywheel 105 mounted on machine frame 10 which is drivingly coupled to chains 103, 104 by a shaft 106 and arrangement of sprockets (not shown).

The lower portions of the conveyor paths are at a level whereby crops moving outwardly along flooring 85 are received by the conveyor buckets upon leaving the outermost edges of the flooring members. The buckets travel in a carrying position along the lower portion of the frame 10 to the end remote from shaker 40, as best seen in FIG. 2, whereupon they travel upwardly in a generally vertical direction for a distance substantially equal to the height of machine frame 10. Near the upper right hand corner of frame 10 as viewed in FIG. 2, the buckets are pivoted so as to discharge their contents into an arrangement for collecting the crops and transferring them from the machine. One preferred arrangement includes a housing member 110 below which is located a conveyor belt (not shown) which is trained around and driven by a plurality of driven rollers, two of which are shown at 111, 112. The conveyor belt can extend out from the harvesting machine to separately carried bins or receptacles or, alternatively, such receptacles could be carried by frame 10. For a more detailed description of the conveyor system reference can be made to my pending application Christel & Bean docket no. 2167 Ser. No. 165,082 filed July 23, 1971. entitled "Conveyor Means for Harvesting Machines" and assigned to the same assignee as the present invention.

In operation, the harvesting machine is moved, for example by a tractor, through a field of bushes or vines planted in rows in a manner whereby the vines or bushes are straddled by the machine frame 10 and, hence, by shaker means 40. The front end of the harvesting machine is at the left hand side as viewed in FIG. 2 and at the top as viewed in FIG. 3. Suitable controls (not shown) are provided for the drive motors 74 and 105. Vibratory or agitating motion is imparted by beater elements 47, 48 to the plants contacted thereby and causes the crops such as grapes to be removed whereupon they fall onto the flooring 85. In particular, beater elements 47, 48 are positioned to bear against the foliage of the plants, and the staggered arrangement of beater elements 47, 48 relative to opposite sides of the machine pushes the foliage first in one direction and then in the other as the machine moves along a row. The plants are agitated further by the alternate movement of beater elements 47, 48 toward and away from each other during machine travel. Shaft 64, being rotated by motor 74, reciprocates rods 67, 68 to move the beater frames and corresponding beater elements 47, 48 fixed thereto rapidly toward and away from the center line of the machine as previously described.

Beater elements 47, 48, being in the form of elongated plates, are dimensioned to have sufficient width so as to be relatively stiff in a vertical direction. The relative stiffness of beater elements 47, 48 in a vertical direction further enhances the effectiveness of the shaking action on the plants. In the present illustration, there are three vertical series of beater elements 47 on one side of the machine and three vertical series of beater elements 48 on the opposite side of the machine, each vertical series, in turn, including four beater elements. The number of beater elements in each series and the vertical position of the elements are varied in accordance with different harvesting conditions as determined, for example, by the variety of grape, the type of terrain, and the position of the trelis wires.

When the crops are shaken from the plants they fall onto flooring 85, whereupon they are transported by the conveyor system to suitable storage receptacles in a manner as previously described. The effective shaking action imparted to the plants by the shaker means of the present invention has been found to provide a maximum removal of crops with little or no damage to either the crops or the plants. In addition, this efficient shaking action removes little or no leaves and other unwanted material from the plants. The foregoing advantageous operating characteristics are provided by a machine which is relatively simple in construction and relatively easy to operate and maintain in an efficient manner.

I claim:

1. A harvesting machine for row crops comprising:
   a. a frame movable along a row of plants in a manner straddling the row;
   b. shaker means carried by said frame and including a plurality of beater elements spaced generally vertically and extending inwardly from opposite sides of said machine to bear against the foliage of the plants, said beater elements of one side of said machine being staggered longitudinally relative to said beater elements of the opposite side of said machine; and
   c. means carried by said frame for moving said beater elements toward and away from the row to shake the crops off the plants.

2. A harvesting machine as defined in claim 1 wherein said means for moving said beater elements includes means for moving said beater elements simultaneously toward and away from the row of plants.

3. A harvesting machine as defined in claim 1 wherein each of said beater elements comprises an elongated plate disposed in a generally vertical plane, said plate having sufficient width to provide relative stiffness in a vertical direction.

4. A harvesting machine as defined in claim 1 wherein each of said beater elements is elongated and is disposed so that the longitudinal axis thereof is horizontal and extends rearwardly relative to the forward direction of travel of said machine along the row.

5. A harvesting machine as defined in claim 1 wherein said beater elements are arranged in a vertical series, there being a plurality of said series on each side of said machine.

6. A harvesting machine as defined in claim 1 further comprising a pair of generally vertical beater frames movably connected to said machine frame, said beater elements being fixed to corresponding ones of said beater frames and wherein said means for moving said beater elements moves said beater frames toward and away from the center of said machine.

7. A harvesting machine as defined in claim 6 wherein said moving means comprises:
   a. a motor fixed to said machine frame;
   b. a shaft drivenly coupled to said motor and rotatably supported in said machine frame, said shaft having a pair of opposed throws spaced axially thereon; and
   c. a pair of rigid members connecting each of said throws to a corresponding one of said beater frames.

8. A harvesting machine as defined in claim 1 further including means for collecting removed crops and for transporting the removed crops to a location in proximity to said machine frame for storage in receptacles.

9. A harvesting machine as defined in claim 8 wherein said means for collecting and transporting removed crops includes conveyor means on said machine frame for transporting crops from a region of collection near the lower portion of said frame to a location near the top of said frame.

* * * * *